United States Patent
Kimborn

[19]

[11] Patent Number: 6,053,006
[45] Date of Patent: Apr. 25, 2000

[54] COLD-STORING INSTALLATION HAVING AN ICE STORAGE RESERVOIR

[75] Inventor: Gunnar Kimborn, Ligerz, Switzerland

[73] Assignee: Delroc SA, Switzerland

[21] Appl. No.: 09/121,364

[22] Filed: Jul. 23, 1998

[30] Foreign Application Priority Data

Oct. 31, 1997 [EP] European Pat. Off. ............. 97810811

[51] Int. Cl.[7] .................................................. F25D 12/02
[52] U.S. Cl. .............................................. 62/434; 62/435
[58] Field of Search ........................... 62/430, 434, 435, 62/59, 99

[56] References Cited

U.S. PATENT DOCUMENTS

| | | | |
|---|---|---|---|
| 2,227,244 | 12/1940 | Candor | 62/434 |
| 4,150,720 | 4/1979 | Brackman | 165/170 |
| 4,294,083 | 10/1981 | King | 62/434 |
| 4,916,916 | 4/1990 | Fischer | 62/199 |
| 4,986,079 | 1/1991 | Koseki et al. | 62/59 |
| 5,255,526 | 10/1993 | Fischer | 62/59 |
| 5,598,720 | 2/1997 | MacCracken et al. | 62/434 |
| 5,647,225 | 7/1997 | Fischer et al. | 62/434 |
| 5,649,431 | 7/1997 | Schroeder | 62/434 |

FOREIGN PATENT DOCUMENTS

| | | |
|---|---|---|
| 0 348 771 | 6/1989 | European Pat. Off. . |
| 348771 | 3/1990 | European Pat. Off. . |
| 2 173 886 | 10/1986 | United Kingdom . |

*Primary Examiner*—William Doerrler
*Attorney, Agent, or Firm*—Zarley, McKee, Thomte, Voorhees & Sease

[57] ABSTRACT

The ice storage reservoir (1) comprises a container (2) filled with water (3) and containing first heat exchangers (4) through which a cooled medium flows when the ice storage reservoir is charged. The water in the container thus turns to ice. For discharging the ice storage reservoir, a medium can be conveyed through the first heat exchangers which is passed through a second heat exchanger (11). Coolable in the second heat exchanger is a working medium which circulates in a working-medium circuit (14) and can be supplied after cooling to a cooling plant. At the same time, during the discharge operation water is withdrawn from the container via drainage facilities (22), conveyed over a third heat exchanger (18), and returned to the container through supply facilities (27). The working medium precooled by the second heat exchanger is led through the third heat exchanger in which further heat is withdrawn from the working medium. Optimum efficiency of the ice storage reservoir is achieved by means of these two circuits.

14 Claims, 6 Drawing Sheets

COLD-STORING INSTALLATION HAVING AN ICE STORAGE RESERVOIR

BACKGROUND OF THE INVENTION

This invention relates to energy storage systems, and more particularly to a cold-storing installation of the type having an ice storage reservoir comprising an insulated container filled with water, heat-exchange pipes inserted in the container and forming a first heat exchanger, a refrigeration unit connected to the first heat exchanger and forming a first circuit in which a medium circulates for charging the ice storage reservoir and passes through the heat-exchange pipes, so that the water in the container is transformable into ice, supply means for supplying water to the container, drainage means for withdrawing cooled water from the container for discharging the storage reservoir, and means for circulating the water in the container.

Such cold-storing installations having an ice storage reservoir are utilized particularly in air conditioning and refrigeration plants having a cold demand which is subject, for example, to very great fluctuations within 24 hours. During the night, for instance, there may be a very low cold demand, whereas during the day this demand can be very high. Without the use of such storage reservoirs, the output of such refrigeration plants would have to be designed for this peak load. However, the plants would then be overdimensioned for the major part of their operating time. Unnecessarily high investment and operating costs would thereby occur, the yield being very low.

By using ice storage reservoirs, cold can be produced during the night, for example. This is particularly worthwhile when electric current can then be procured at a reduced rate. During the daytime, the cold demand can then be covered by the storage reservoir, for instance, and peak power loads attributable to refrigeration units are greatly decreased. Such plants can thereby be made smaller, thus leading to better efficiency of the plant and lower operating costs.

Cold-storing installations having an ice storage reservoir have already been proposed. Here the ice storage reservoirs, consisting of an insulated container filled with water, are provided with heat exchangers having suitable heat-exchange pipes. To charge the storage reservoir, a medium cooled in a refrigeration unit is passed through the heat-exchange pipes. This produces in the container growing ice cylinders disposed about the respective heat-exchange pipes. To discharge this storage reservoir, water is supplied to the container from above while the cooled water can be drained at the bottom of the containers. During this operation, water flows around the ice cylinders formed about the heat-exchange pipes, and these cylinders melt.

One drawback of this type of ice-water storage reservoir is that when it is charged, the water in the container must not freeze completely into a block of ice since there must be room for the water to flow through in order that an efficient transfer of heat may take place between the ice cylinders and the water. Consequently, the individual heat-exchange pipes must be sufficiently far apart, resulting in a large space requirement. Furthermore, each discharge must be carried out until the ice is completely melted before charging, i.e., ice formation, can be started again. If complete melting does not take place, the danger exists that through irregular melting and irregular ice formation, large blocks of ice may be formed in the container through which the water no longer flows for discharging, leading to a loss of efficiency. Thus, it is necessary for such ice storage reservoirs to be monitored, which calls for additional personnel. Hence such ice storage reservoirs are more suitable for industrial operations. By means of this ice storage reservoir, however, the advantage is achieved that the water drained off at the time of discharge has a low temperature and that there is good discharge performance.

Ice-storage reservoirs have also been proposed which likewise have a water-filled insulated container in which heat exchangers having heat-exchange pipes are inserted in the same way and through which a medium cooled in a refrigeration unit circulates, so that the water in the container is converted into ice when the storage reservoir is charged. Here cooling can take place until the water is completely frozen and forms a block of ice. Such ice storage reservoirs are discharged in the same way they are charged, via the heat-exchange pipes of the heat exchangers, by passing the medium to be cooled through the heat-exchange pipes, whereupon the cooled medium can then be supplied to a suitable installation. Through the heat transfer, the ice is melted, this taking place initially in the immediate vicinity of the heat-exchange pipes. Such ice storage reservoirs have the advantage of very compact construction since the heat-exchange pipes can be disposed relatively close to one another. Operational reliability is very high; it is not necessary to carry out the discharge until the ice has completely melted into water; charging can take place again at any time. Such ice storage reservoirs are not so efficient as those described before since a space filled with water is produced between the heat-exchange pipes and the surrounding ice quite soon after the discharge operation, whereby the efficiency of the heat transfer is restricted.

It is an object of this invention to provide a cold-storing installation having an ice storage reservoir which is so designed that high efficiency is achieved.

Another object of the invention is to provide such a cold-storing installation wherein the ice storage reservoir can be charged at any time without complete discharge having to take place beforehand.

A further object of the invention is to provide a cold-storing installation wherein the cooled medium made available has a low temperature.

Still another object of the invention is to provide such an installation requiring no monitoring personnel.

SUMMARY OF THE INVENTION

To this end, in the cold-storing installation according to the present invention, of the type initially mentioned, the heat-exchange pipes of the first heat exchanger form together with at least one second heat exchanger a second circuit, through which second circuit the medium can be diverted during discharge of the storage reservoir, and a working-medium circuit is further provided which is formed by the second heat exchanger, return pipe, and supply pipe as a connection to a cooling plant in which a working medium circulates and can be diverted through the second heat exchanger and cooled therein, and between the return pipe and the supply pipe in the working-medium circuit there are means by which the cooled water withdrawable from the container can be brought into operative contact with the working medium so that the working medium is additionally cooled.

By means of this arrangement, the respective advantages which distinguish the two previously described ice storage reservoirs take effect jointly. During discharge of the storage reservoir, passages are very quickly created through melting of the ice between the heat-exchange pipes of the first heat exchangers in the container and the ice surrounding them, through which passages the water can circulate. The medium flowing through the heat-exchange pipes of the first heat exchangers is directed via a second circuit into a second heat exchanger in which the working medium of the working-medium circuit is cooled. At the same time, water is withdrawn from the container, by means of which the working medium can be additionally cooled. Optimum efficiency is thereby achieved.

The water withdrawn during discharge of the ice storage reservoir may, for example, additionally cool the working medium via a heat exchanger and thereafter be returned to the container; however, it is also conceivable that the water withdrawn from the container be directly added to the working medium, whereby additional cooling is likewise achieved. In this application, fresh water may also be supplied to the container.

The return pipe and the delivery pipe in the working-medium circuit are preferably directly connected to one another via a further pipe, a bypass valve being disposed at the point of connection of the further pipe to the delivery pipe, thus making it possible to regulate the temperature of the working medium delivered by the respective installation.

In order to achieve good efficiency, it is necessary for the water in the container to be kept constantly in motion, for which purpose circulation means are provided. Such means preferably consist of a compressed-air supply network, the ducts of which are disposed at the bottom of the container and into which compressed air can be fed, which then flows out into the container through bores made in the ducts and rises to the surface of the water in the form of bubbles. Optimum movement of the water in the container is thereby achieved in a simple manner; no dead spaces can occur.

In another advantageous design of the invention, the supply of water takes place over the entire surface in the container, and withdrawal of the water is carried out distributed over the entire bottom surface of the container. A uniform discharge of the ice storage reservoir is thereby achieved.

BRIEF DESCRIPTION OF THE DRAWINGS

Preferred embodiments of the invention will now be described in detail with reference to the accompanying drawings, in which.

DESCRIPTION OF THE PREFERRED EMBODIMENT

Figure 1:
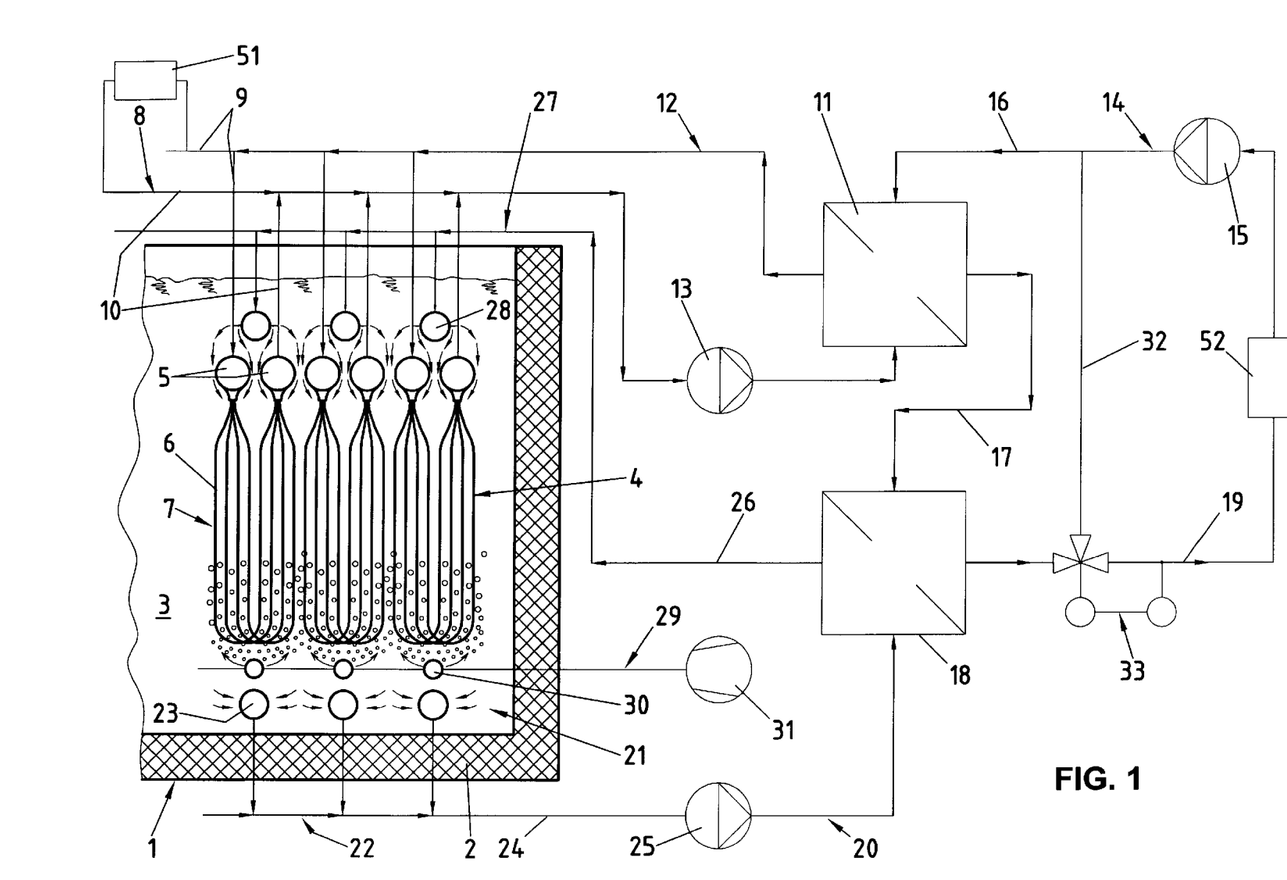
FIG. 1 is a circuit diagram of part of a cold-storing installation in a first embodiment of the invention.

As may be seen from FIG. 1, the cold-storing installation comprises an ice storage reservoir 1 consisting of an insulated container 2 filled with water 3. Inserted in container 2 are first heat exchangers 4, each of which consists of two parallel pipes 5 connected to one another by heat-exchange pipes 6 forming a loop 7 as will be described below.

First heat exchangers 4 form together with a diagrammatically indicated refrigeration unit 51, known per se, a first circuit 8 in which a medium, preferably a glycol solution, circulates in a manner known per se. During charging of ice storage reservoir 1, this medium reaches first heat exchangers 4 from refrigeration unit 51 through supply pipes 9 and returns to unit 51 through evacuation pipes 10. During this charging operation, the water 3 in container 2 freezes into ice, as will be described below.

For discharging the ice storage reservoir 1, refrigeration unit 51, which forms first circuit 8 together with first heat exchangers 4, is disconnected in a manner known per se. First heat exchangers 4 now form together with a second heat exchanger 11 a second circuit 12 in which the medium can circulate, driven by a second pump 13.

A working medium circulating in a working-medium circuit 14 flows through second heat exchanger 11, driven by a first pump 15. This working medium may, for example, reach second heat exchanger 11 over a return pipe 16 from a diagrammatically indicated cooling plant 52. Via a connection pipe 17, the working medium reaches a third heat exchanger 18, flows through it, and is supplied to cooling plant 52 through a delivery pipe 19.

In a third circuit 20, water 3 of container 2 flows through third heat exchanger 18. For this purpose, drainage means 22, consisting of a plurality of conduits 23 regularly distributed and interconnected, are disposed at the bottom 21 of container 2. Conduits 23 are provided with ports through which the water to be withdrawn can flow into conduits 23. This water is conveyed through a pipe 24 by means of a third pump 25 into third heat exchanger 18, flows through the latter, and is supplied through a pipe 26 to supply means 27.

Supply means 27 likewise consist of a plurality of conduits 28 which are regularly distributed near the surface of the water 3 in container 2 and interconnected. Conduits 28 are likewise furnished with ports through which the water flowing back can run out into container 2.

At the bottom 21 of container 2, means 29 are provided for circulating the water 3 in container 2. Means 29 consist of a compressed-air supply network, the ducts 30 of which are disposed at the bottom 21 of container 2. Via an air compressor 31, compressed air is supplied to ducts 30, which are provided with bores through which the compressed air supplied passes out into the water 3. The bubbles rise in the water 3 of container 2, whereby virtually the entire volume of water is kept in motion.

The medium conveyed from first heat exchangers 4 into second heat exchanger 11 has a temperature of, say, about 3° C. The working medium directed into second heat exchanger 11 has a temperature of about 9° C. In second heat exchanger 11, this working medium is cooled to about 5° C. The medium led off from second heat exchanger 11 and returned to first heat exchangers 4 is warmed up at this time to about 7° C.

The water conveyed through pipe 24 into third heat exchanger 18 has a temperature of, say, about 0.3° C. In third heat exchanger 18, the working medium supplied through pipe 17, having a temperature of about 5° C., is cooled to, say, 1° C. This cooled working medium is then supplied over delivery pipe 19 to cooling plant 52. The water returned to container 2 through pipe 26 has a temperature of about 3° C. after leaving third heat exchanger 18.

Provided between return pipe 16 of working-medium circuit 14 and delivery pipe 19 is a further pipe 32 which connects return pipe 16 and delivery pipe 19 directly to one another. A bypass valve 33 is disposed at the point of connection of pipe 32 to delivery pipe 19. Bypass valve 33 can be activated in a manner known per se, whereby the supply temperature of the working medium can be regulated.

Figure 2:
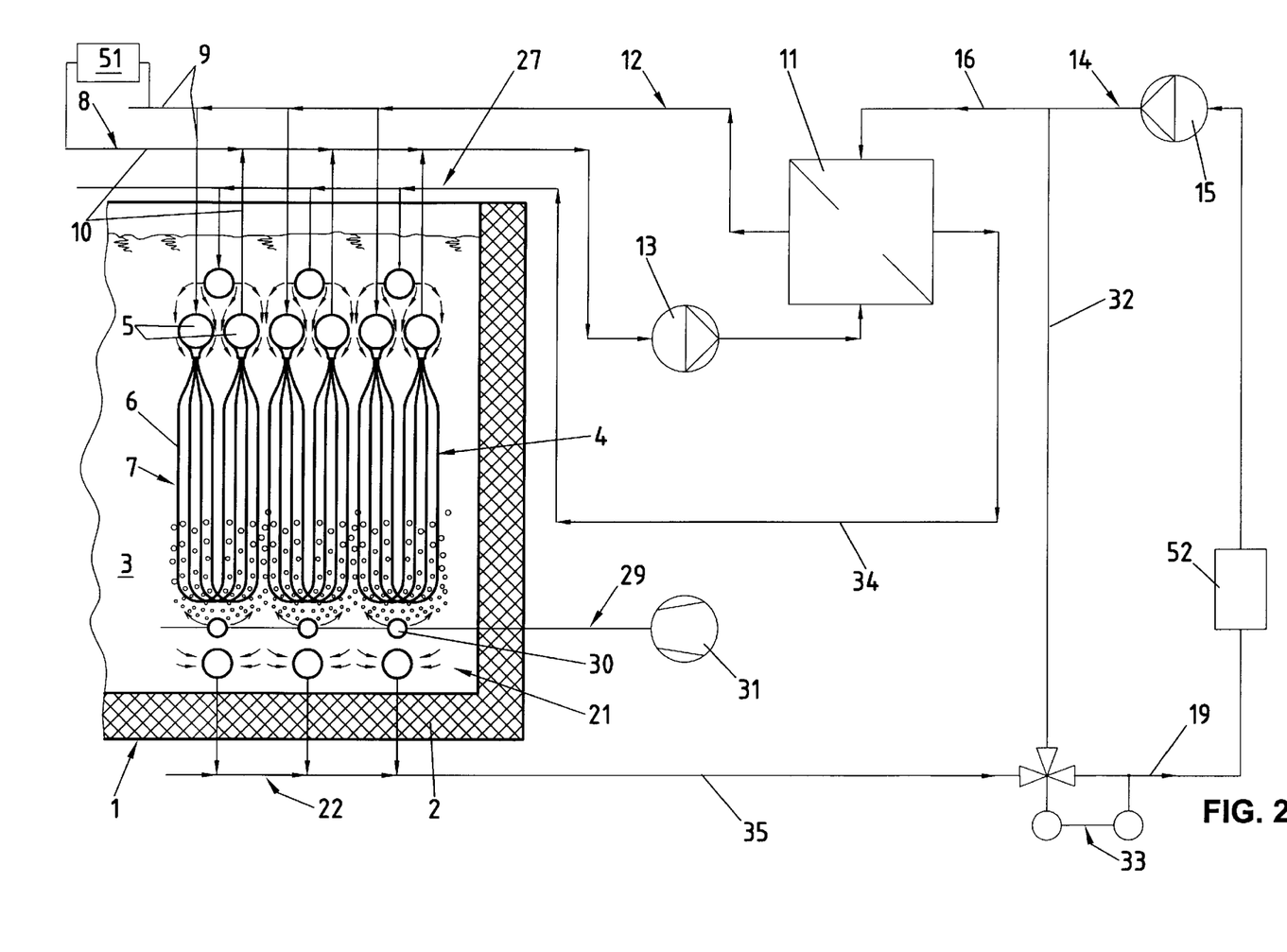
FIG. 2 is a circuit diagram of part of a cold-storing installation in a second embodiment of the invention.

FIG. 2 is a circuit diagram of a cold-storing installation having an ice storage reservoir in a second embodiment of the invention. In the description of this second embodiment, the same reference numerals as in the description of FIG. 1 are used for identical components. In the same way as in the first embodiment, ice storage reservoir 1 consists of an insulated container 2 filled with water 3. Likewise provided are first heat exchangers 4, formed by pipes 5 and heat-exchange pipes 6, forming loops 7. Charging of ice storage reservoir 1 takes place in the same way as described with reference to FIG. 1, via first circuit 8, the water 3 in container 2 freezing into ice.

As in the embodiment of FIG. 1, refrigeration unit 51 and first circuit 8 are disconnected for discharging ice storage reservoir 1. Via second circuit 12, the medium, which here, too, is a glycol solution, is conveyed by means of second pump 13 through second heat exchanger 11 and arrives back at first heat exchangers 4. Conveyed through second heat exchanger 11 in the same way as in the previously described embodiment is the working medium which circulates in a working-medium circuit 14, driven by first pump 15. In this embodiment, the working medium is water.

After passing through second heat exchanger 11, the water is conveyed over a first connecting pipe 34 to supply means 27, thus reaching container 2. Drainage means 22 are connected via a second connecting pipe 35 to delivery pipe 19 of working-medium circuit 14.

The water conveyed to second heat exchanger 11 through return pipe 16 has a temperature of, say, about 9° C. In second heat exchanger 11 it is cooled to, say, about 5° C. The medium introduced into second heat exchanger 11, coming from first heat exchangers 4, has a temperature of about 3° C., is warmed to, say, 7° C. in second heat exchanger 11, and is returned to first heat exchangers 4. The water withdrawn from container 2 via drainage means 22 has a temperature of, say, about 0.3° C. and reaches delivery pipe 19 thus.

In this embodiment, too, return pipe 16 and delivery pipe 19 are directly connected to one another by a further pipe 32, a bypass valve 33 likewise being inserted at the connection point between further pipe 32 and delivery pipe 19, whereby the delivery temperature can be regulated in a manner known per se.

Figure 3:
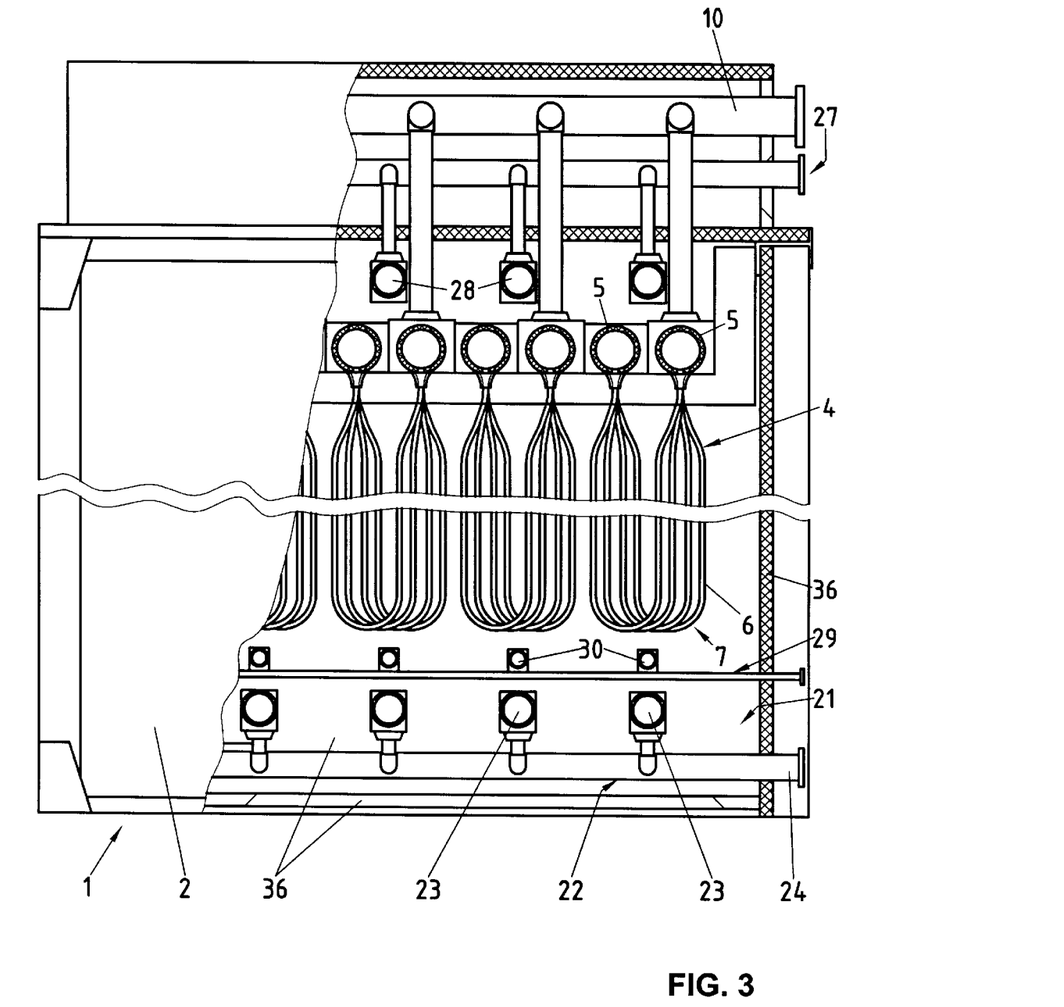
FIG. 3 is an elevation, partially cut away and in section, of an ice storage reservoir.

FIG. 3 shows the construction of an ice storage reservoir 1. It consists of container 2, composed of insulated walls 36. Inserted in container 2 are first heat exchangers 4, composed of parallel disposed pipes 5 which are interconnected via heat-exchange pipes 6 forming loops 7. One of each of the pipes 5 is connected to evacuation pipe 10. The other pipe 5 of first heat exchangers 4 is connected in a manner not shown to supply pipe 9 (FIG. 1). In this illustration supply means 27 may be seen, consisting, as already described in connection with FIG. 1, of conduits 28 having bores through which the water can flow out into container 2.

Shown at the bottom 21 of container 2 are drainage means 22 which likewise comprise conduits 23, as already described, provided with bores through which the water in container 2 can reach conduits 23 and be led off through pipe 24 for further use.

Also disposed at the bottom 21 of container 2, as already mentioned, are means for causing the water in container 2 to circulate, formed of compressed-air ducts 30 provided with bores through which the compressed air supplied can escape into the water 3 of container 2.

Figure 4:
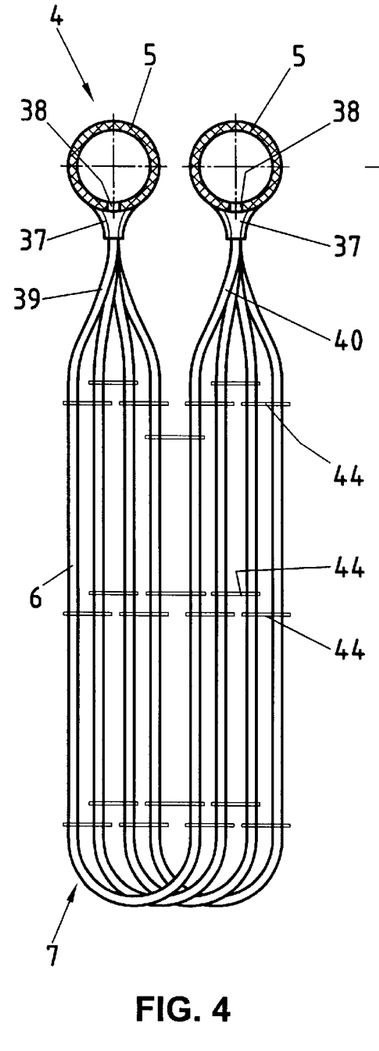
FIG. 4 is a perspective view of the first heat exchanger in the longitudinal direction of the pipes.
Figure 5:
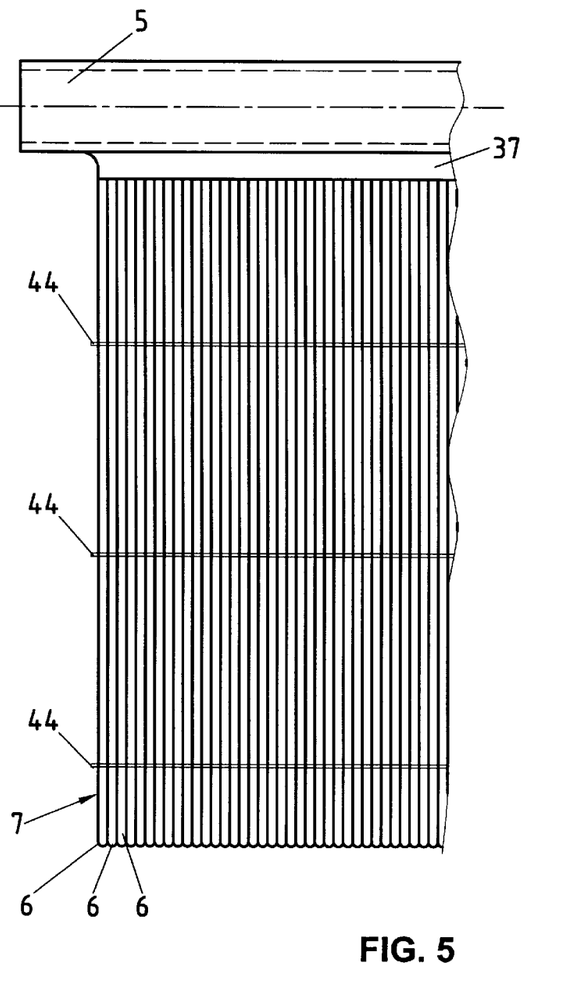
FIG. 5 is a partial side elevation of the first heat exchanger of FIG. 4.

FIGS. 4 and 5 show the construction of first heat exchangers 4. Each such first heat exchanger 4 is formed of two parallel pipes 5, along each of which there is a channel 37 communicating with the respective pipe 5 via bores 38. One end 39 of a heat-exchange pipe 6 is inserted in the channel 37 of one of the pipes 5. The other end 40 of that heat-exchange pipe 6 is connected to the other channel 37 of the other pipe 5. The respective heat-exchange pipe 6 thereby forms a loop 7.

Pipes 5, channels 37, and heat-exchange pipes 6 of first heat exchangers 4 are preferably made of polypropylene.

As may be seen in FIG. 5, heat-exchange pipes 6 are inserted in the respective channel 37 resting directly against one another. In order that heat-exchange pipes 6 may be distributed as uniformly as possible in the water volume of container 2, adjacent loops 7 are mutually offset in the respective plane perpendicular to pipes 5. These heat-exchange pipes 6 are held in the proper position by spacers 44. First heat exchangers 4 are cost-effective to manufacture.

Figure 6:
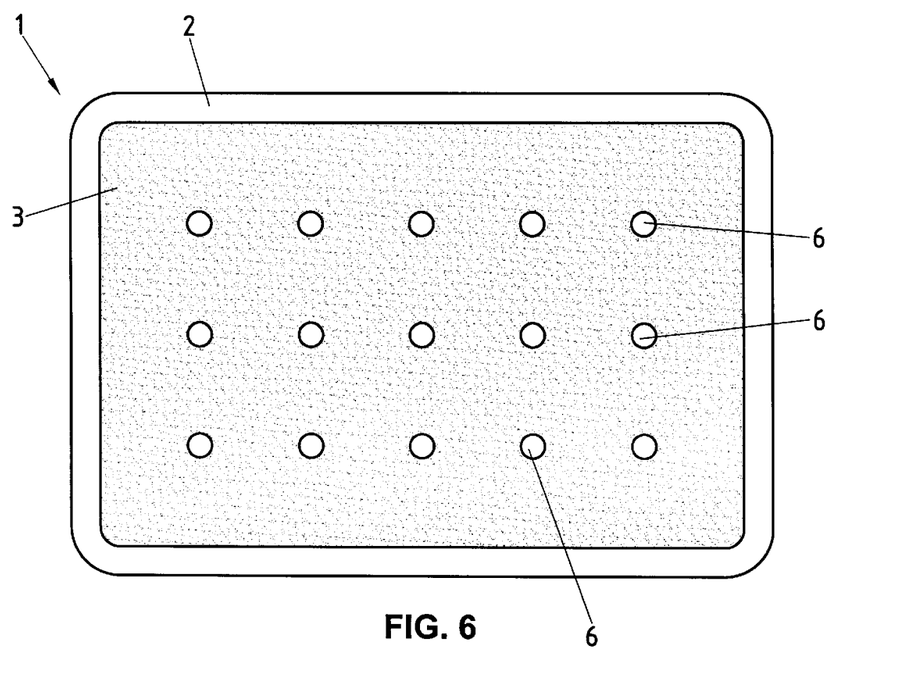
FIG. 6 is a diagrammatic horizontal section through the container when the ice storage reservoir is completely discharged.

The formation of the ice in the ice storage reservoir during charging and the melting of the ice during discharging of the ice storage reservoir will now be described with reference to FIGS. 6 to 9. FIG. 6 is a sectional plane through container 2 of ice storage reservoir 1 perpendicular to the vertical heat-exchange pipes 6, showing the state of the ice storage reservoir when completely discharged. The water 3 is entirely free of ice.

In this state, the ice storage reservoir is charged as has been is described in connection with FIG. 1. The glycol solution cooled to below 0° C. is conveyed through heat-exchange pipes 6. Ice is formed in the immediate vicinity of heat-exchange pipes 6; ice cylinders 41 are formed, in the center of each of which a heat-exchange pipe 6 runs, as shown in FIG. 7.

Figure 7:
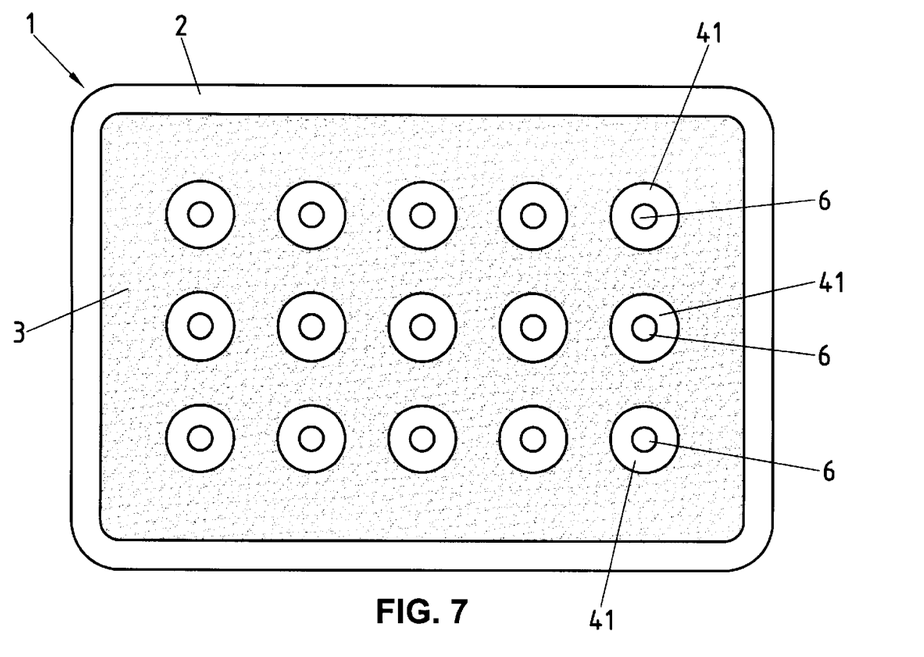
FIG. 7 is a view of the container analogous to FIG. 6 during charging of the ice storage reservoir with incipient formation of ice.
Figure 8:
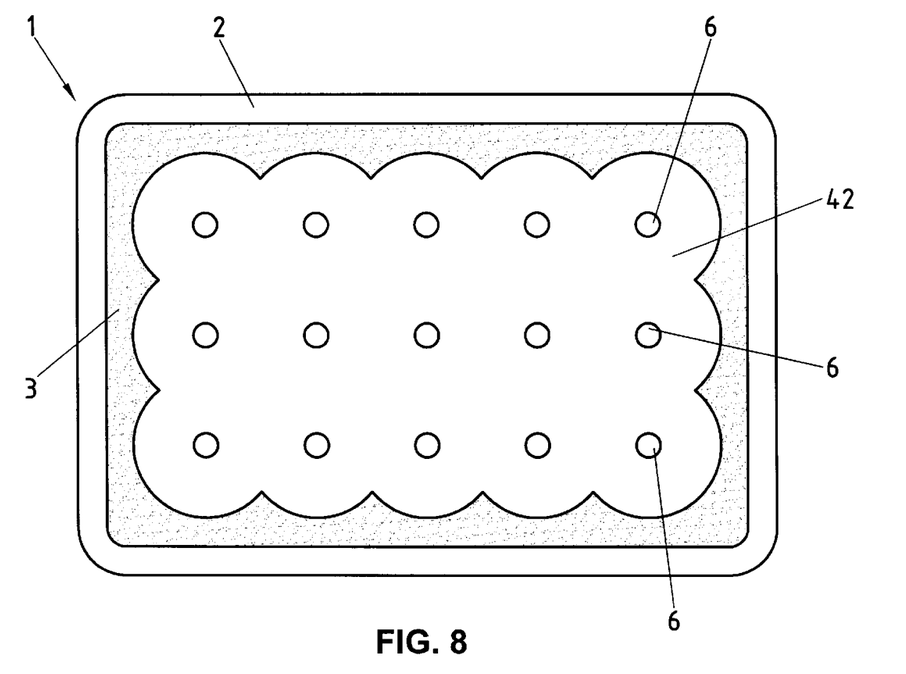
FIG. 8 is a view of the container analogous to FIGS. 6 and 7 when the ice storage reservoir is completely charged.

This charging operation is continued until the ice cylinders 41 shown in FIG. 7 merge and form an integral ice block 42, as shown in FIG. 8. This ice block 42 does not completely fill container 2 and is surrounded by water 3 on all sides.

Figure 9:
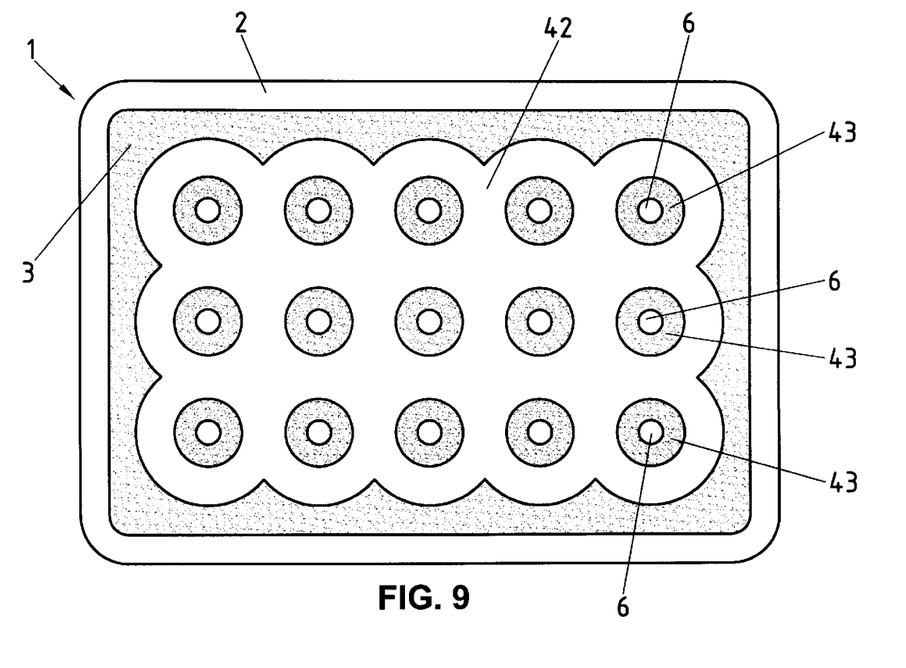
FIG. 9 is a view of the container analogous to FIGS. 6 to 8 when the ice storage reservoir is partially discharged.

For discharging ice storage reservoir 1, as described in connection with FIGS. 1 and 2, the glycol solution which has withdrawn heat from the working medium in second heat exchanger 11 is conveyed through heat-exchange pipes 6. By means of this operation, ice block 42, as illustrated in FIG. 8, begins to melt in the immediate vicinity of heat-exchange pipes 6, as shown in FIG. 9; cylindrical spaces 43 are formed, filled with water. Besides this operation, the water 3 in container 2 is also withdrawn at the bottom, as has likewise been described in connection with FIGS. 1 and 2, is warmed by the withdrawal of heat from the working medium, and is fed back into container 2 at the top; the water therefore flows through cylindrical spaces 43. In order that this may take place as uniformly as possible throughout the whole container 2, means 29 are provided (FIGS. 1 and 2) by which the water 3 is continuously kept moving during the discharge operation. Through this manner of proceeding, a very great surface is formed in ice block 42 at which the ice melts. The water in cylindrical spaces 43 flows virtually in a countercurrent to the air fed in from below by means 30. Very good heat transmission is thereby achieved. During the melting operation, the effective ice surface becomes increasingly larger. Very high efficiency of such ice storage reservoirs is thereby achieved; the attainable temperature of the cooled working medium is just slightly above 0° C.

This discharge operation, as illustrated in FIG. 9, can be continued until the ice is completely melted, whereby the starting situation, shown in FIG. 6, is reached. However, the discharge need not go on until total melting of the ice; charging of the ice storage reservoir may also begin again in an intermediate stage, as shown in FIG. 9, for example, without any damage occurring. This is because formation of the ice always begins around heat-exchange pipes 6; changes in volume can be compensated for by the flow-off of the water in the spaces between the newly formed ice and the ice block.

By means of the inventive cold-storing installation, the requirements to be met by such an ice storage reservoir are fulfilled in an optimum manner; efficiency is high, while operating costs and plant costs are low.

The cold-storing installation according to the present invention is preferably used in district refrigerating plants or for process cooling. It ensures high operating reliability and low discharge temperatures.

What is claimed is:

1. A cold-storing installation comprising:
   an ice storage reservoir including an insulated container filled with water;
   heat-exchange pipes inserted in said container and forming a first heat exchanger;
   a refrigeration unit connected to said first heat exchanger and forming a first circuit;
   a medium intended to circulate in said first circuit for charging said ice storage reservoir and to pass through said heat-exchange pipes for transforming the water in said container into ice having interior surfaces adjacent the heat exchange pipes and exterior surfaces directed away from the heat-exchange pipes;
   supply means for supplying water to said container;
   drainage means for withdrawing cooled water from said container to discharge said ice storage reservoir;
   circulation means for causing the water in said container to circulate;
   at least one second heat exchanger forming together with said heat-exchange pipes of said first heat exchanger a second circuit through which said medium can be diverted during discharge of said ice storage reservoir;
   a cooling plant;
   a working medium intended to circulate in said cooling plant;
   a return pipe and a delivery pipe forming together with said second heat exchanger a working-medium circuit as a connection to said cooling plant;
   diversion means for diverting said working medium through said second heat exchanger and for cooling said working medium therein;
   means disposed between said return pipe and said delivery pipe and said working-medium circuit for bringing said cooled water withdrawn from said container into operative contact with said working medium, whereby said working medium is additionally cooled;
   discharging means including the second circuit, the supply means, the circulation means, and the drainage means all operating concurrently so as to melt the ice formed in the container at both the interior and exterior surfaces of the ice simultaneously to increase efficiency.

2. The cold-storing installation of claim 1, wherein said working medium circulating in said working-medium circuit is water.

3. The cold-storing installation of claim 1, wherein said working-medium circuit comprises a first pump and said second circuit comprises a second pump.

4. The cold-storing installation of claim 1, wherein said means disposed in said working-medium circuit comprise a third heat exchanger disposed after said second heat exchanger, said working medium being conveyable though said third heat exchanger after passing through said second heat exchanger, further comprising a third circuit including said third heat exchanger through which the water withdrawn from said container via said drainage means can be conveyed and can be returned to said container via said supply means.

5. The cold-storing installation of claim 4, further comprising a third pump included in said third circuit.

6. The cold-storing installation of claim 1, wherein said means disposed in said working-medium circuit comprise a first connection pipe connecting said second heat exchanger to said supply means, whereby said working medium reaches said container after passing through said second heat exchanger, and a second connection pipe connecting said drainage means to said delivery pipe of said working-medium circuit.

7. The cold-storing installation of claim 1, wherein said working-medium circuit includes a further pipe connecting said return pipe and said delivery pipe and a bypass valve disposed at the connection point of said further pipe to said delivery pipe.

8. The cold-storing installation of claim 1, wherein said medium circulating in said first circuit and in said second circuit is a glycol solution.

9. The cold-storing installation of claim 1, wherein said circulation means comprise a compressed-air supply network having ducts disposed at the bottom of said container and including a plurality of bores, the compressed air fed to said ducts flowing out through said bores.

10. The cold-storing installation of claim 1, wherein said supply means comprise a plurality of conduits disposed near and distributed over the surface of the water in said container, said conduits being interconnected and provided with ports through which the supplied water flows out.

11. The cold-storing installation of claim 1, wherein said drainage means comprise a plurality of conduits disposed near and distributed over the bottom of the container filled with water, said conduits being interconnected and provided with ports through which the water to be drained flows into said conduits.

12. The cold-storing installation of claim 1, wherein said first heat exchangers are formed of two parallel pipes, each of which is provided with a longitudinally running channel communicating with the respective pipe via bores, one end of each of said heat-exchange pipes being inserted in the said channel of one pipe, and the other end of each of said heat-exchange pipes being inserted in the said channel of the other pipe, whereby each of said heat-exchange pipes forms a loop.

13. The cold-storing installation of claim 12, wherein said ends of said heat-exchange pipes are inserted in said channels of said pipes in such a way that said heat-exchange pipes lie immediately next to one another, adjacent said loops being mutually offset in the respective plane perpendicular to said pipes and held in this position by spacers.

14. The cold-storing installation of claim 12, wherein said pipes, said channels, and said heat-exchange pipes of said first heat exchanger are made of polypropylene.

\* \* \* \* \*